United States Patent [19]
Davis et al.

[11] 3,762,226

[45] Oct. 2, 1973

[54] CONTROL MOMENT GYROSCOPE WITH INTEGRAL TORQUE CONTROL

[75] Inventors: Lawrence P. Davis; John E. Harrison, both of Phoenix; Everett R. Tribken, Scottsdale, all of Ariz.

[73] Assignee: Sperry Rand Corporation, New York, N.Y.

[22] Filed: Apr. 7, 1971

[21] Appl. No.: 131,964

[52] U.S. Cl. ........................... 74/5.4, 74/5 F
[51] Int. Cl. ............................. G01c 19/30
[58] Field of Search ............... 74/5.4, 5.41, 5.6, 74/5; 73/136 R

[56] References Cited
UNITED STATES PATENTS

| | | | |
|---|---|---|---|
| 3,301,070 | 1/1967 | Lapierre | 74/5.4 |
| 3,481,192 | 12/1969 | Herzog et al. | 73/136 R |
| 3,068,705 | 12/1962 | Tilly et al. | 74/5.4 |
| 3,456,511 | 7/1969 | Clark et al. | 74/5.4 |
| 2,986,943 | 6/1961 | Lair et al. | 74/5.4 |

*Primary Examiner*—Manuel A. Antonakas
*Attorney*—S. C. Yeaton

[57] ABSTRACT

A vehicle control mounted moment gryoscopic apparatus which employs a closed loop torque feedback system and includes a gyroscopic rotor disposed within a shell-like housing. The rim of the shell-like housing functions as the inner gimbal assembly and is coupled to a half-ring cantilevered middle gimbal assembly. The middle gimbal assembly is connected through a spindle to a flexure plate within a base gimbal assembly. Torque sensors are affixed to the flexure plate and provide torque feedback signals in accordance with the magnitude of the actual torques applied between the vehicle and the gyroscopic apparatus. The torque feedback signals are combined in a summing device with torque command signals to produce differential torque signals proportional to the difference between the torque command signals and the applied torque signals. Control law circuits translate the differential torque signals into controlled torque signals that are applied to torquers which drive the inner and middle gimbal assemblies in a direction that provides a substantial reduction in the magnitude of the differential torque signals.

16 Claims, 7 Drawing Figures

United States Patent [19]
Davis et al.
[11] 3,762,226
[45] Oct. 2, 1973
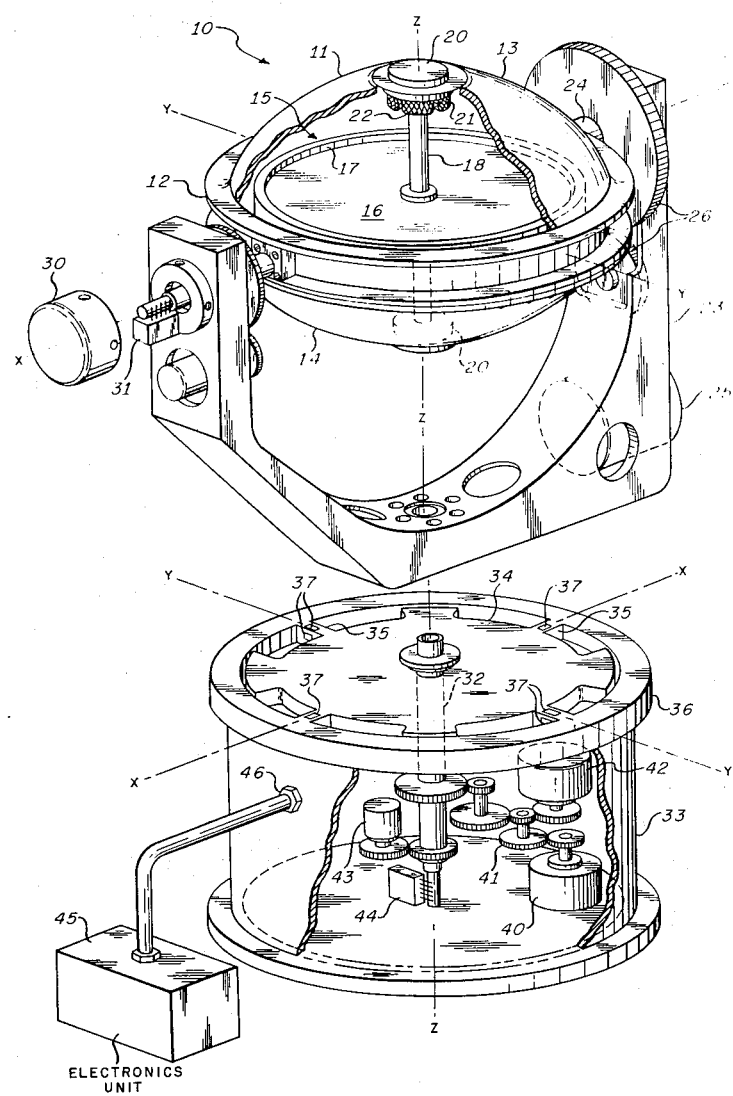

$T_x \propto \frac{AD}{BC}$ $T_z \propto \frac{A''D''}{B''C''}$ $T_Y \propto \frac{A'D'}{B'C'}$

INVENTORS
LAWRENCE P. DAVIS
JOHN E. HARRISON
EVERETT R. TRIBKEN
BY
ATTORNEY

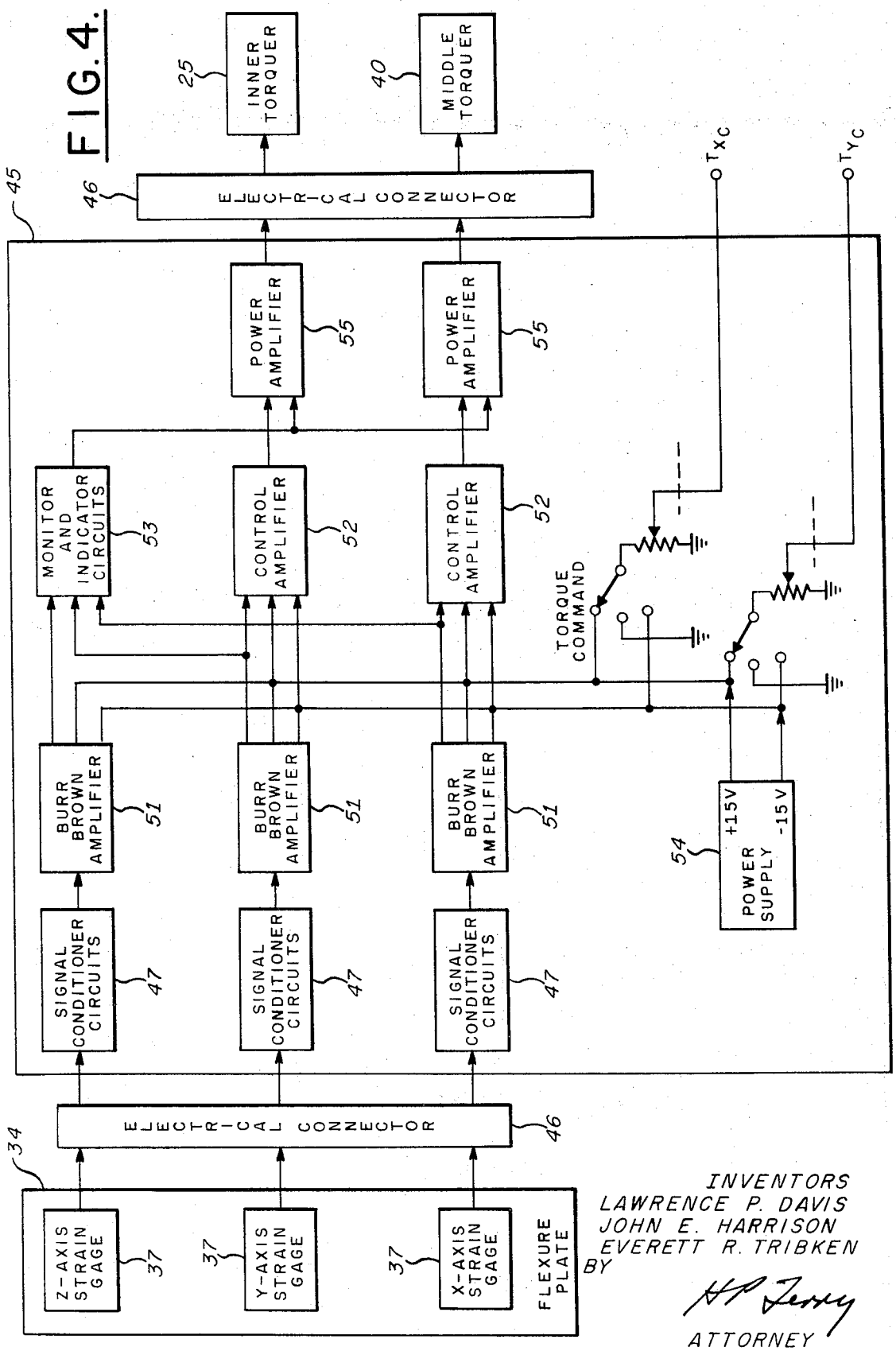

3,762,226

CONTROL MOMENT GYROSCOPE WITH INTEGRAL TORQUE CONTROL

BACKGROUND OF THE INVENTION

1. Field of the Invention

The invention pertains to gyroscopic control apparatus generally referred to as control moment gyroscopes which function as the actuators or torquing elements in a control system. The input signals to a control moment gyroscope are torque command signals received from the vehicle in which the control moment gyroscope is mounted and its outputs are torques applied to the body axes of the vehicle.

2. Description of the Prior Art

Control moment gyroscopes described in the prior art use open-loop torque control or rate control to achieve control accuracy.

An attitude control system using control moment gyroscopes requires logic circuits which translate vehicle axis torque command signals into gimbal torque commands. This translation must be accurate and accommodate all gyroscopic cross-coupling effects. In an open-loop torque control system, measurement or definition of rotor speed, rotor inertia, gimbal inertia, gimbal rate and gimbal position must be provided as inputs to the control logic. Computational inaccuracies are introduced as a result of the additional complexity of the control logic circuitry to process this data. In a rate control system, variations in angular momentum of the gyroscopic rotor can seriously affect the torquing accuracy since torque is a function of the product of gimbal rate and angular momentum.

The number of components required to sense and process the multiplicity of data in addition to the size and weight of conventional gyroscopic structures used in control moment gyroscopes results in systems that are inefficient due to computational inaccuracies and expensive because of their excessive bulk and volume.

A control moment gyroscope as disclosed herein greatly simplifies the control logic thereby increasing the accuracy and reduces the weight and volume through a unique cantilever structure of the middle gimbal assembly.

SUMMARY OF THE INVENTION

The subject invention is a control moment gyroscope having inner, middle and base gimbal assemblies including a torque transducer in the form of a metal flexure plate disposed within the base gimbal assembly. Structural displacements are produced in the metal flexure plate in proportion to torques actually applied by the gyroscope to the vehicle in which the gyroscope is mounted. These structural displacements are transferred to beams which connect the flexure plate to the base gimbal assembly. Torque sensors, typically strain gauges, are affixed to the surfaces of the connecting beams for transforming the structural displacements into torque feedback signals. A summing device combines the torque feedback signals with torque command signals applied by the vehicle to the gyroscope. Differential torque signals from the summing device are translated into torque control signals by control law circuits and applied to actuators which provide opposing torque to the inner and middle gimbal assemblies thereby cancelling the differential torque signals.

The middle gimbal assembly is a half ring cantilevered structure that provides a weight and volume reduction in contrast to full ring gimbals that are supported at two locations. In addition, the cantilever mounting configuration simplifies installation of the gyroscope in a vehicle and provides a weight reduction in that the supporting base gimbal assembly can be confined to a small volume on one side of the middle gimbal assembly rather than skirting the entire perimeter of a full ring gimbal.

The flexure plate transducer and the torque feedback produce intelligence that allows simplified control laws to be used which provide further improvement of the control accuracy. Without torque feedback, direct control error results and it is necessary to compensate for this error by measuring gimbal angles and computing undesirable gyroscopic effects. Further, the use of torque feedback allows an otherwise irreversible torquer gear drive to function as reversible gear drive and a two-gimbal gyroscope to operate as a two-degree of freedom gyroscope. This minimizes one of the primary deficiencies of a control moment gyroscope as it permits the use of relatively large gear reductions and eliminates the necessity of large direct drive torquers thereby decreasing power and weight requirements.

BRIEF DESCRIPTION OF THE DRAWINGS

FIG. 4 is an electrical schematic diagram of the electronics unit.

DESCRIPTION OF THE PREFERRED EMBODIMENT

Figure 1:
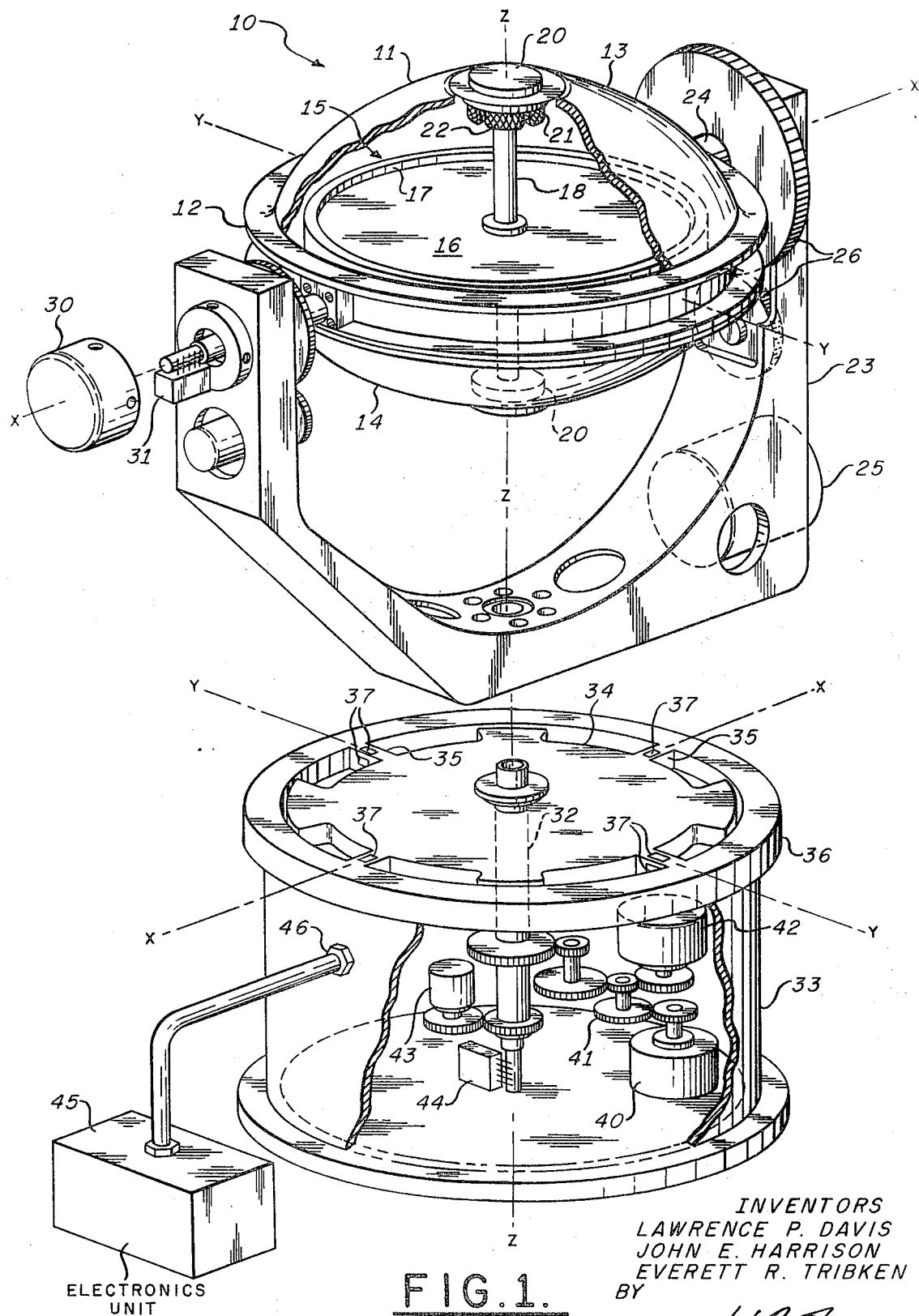
FIG. 1 is a schematic diagram of a control moment gyroscope incorporating the invention.

Referring to FIG. 1, a control moment gyroscope 10 has an inner gimbal assembly 11 which includes a channel sectioned ring section 12 disposed between upper and lower shell-like portions 13 and 14, respectively. Mounted within the inner gimbal assembly 11 is a rotor assembly 15 which includes a flat disc-shaped inner portion 16 having a raised outer rim 17. The rotor assembly 15 is rotatably supported relative to the inner gimbal assembly 11 through an axle 18 in the bearings 20 located in the upper and lower shell-like portions 13 and 14. A spin motor assembly comprised of a rotor 21 affixed to the upper section of the axle 18 coacts with a stator 22 disposed within the upper shell-like portion 13 to rotate the rotor assembly 15 about a Z axis. The inner gimbal assembly 11 is rotatably connected to a middle gimbal assembly 23 through a shaft 24 which is driven by an inner gimbal assembly torque-tachometer module 25, through gears 26 to provide rotation of the inner gimbal assembly 11 about X and Y axes.

The middle gimbal assembly 23 is a bifurcate structure having a spindle 32 that is attached in cantilevered fashion from a base gimbal assembly 33 of the control moment gyroscope 10. This form conserves the space and weight required as well as simplifying the design. The cantilevered concept eliminates the need for a base gimbal. Instead, the only requirements are a base housing 36 for a middle gimbal torque module 40 and support of the single middle gimbal trunnion. The configuration of the middle gimbal assembly 23 is based on its natural frequency. This requirement is more stringent than stress and a value of 100 cps was selected for the design of one embodiment. The resulting stiffness combined with other portions of the structure produced a combined fundamental in excess of 10 cps which was adequate to obtain the desired practical response.

The cross-section of the middle gimbal assembly 23 is a hollow box section proportioned to yield an isoelastic structure which provides a deflection of the structure in the same direction in which a load is applied. The middle gimbal assembly 23 has a tapered cross-section to give maximum strength at the base of the bifurcate structure where the maximum moment occurs, thereby yielding a more efficient weight-to-stiffness ratio than a uniform cross-section.

Further, the torque-tachometer module 25 and the gears 26 are disposed in one branch of the bifurcate structure while a synchro 30 and a brush assembly 31, also coupled to the shaft 24, are mounted in the other branch. The base gimbal assembly 33 is coupled to the middle gimbal assembly 23 through a flexure plate 34 which engages the spindle 32. The flexure plate 34 is affixed through beam 35 to a base 36, which also encloses the base gimbal 31. Strain gauges 37 are attached to the beam 35 and electrically coupled to an electronics unit 45. The middle gimbal assembly torquer 40 is disposed within the base gimbal assembly 33 and coupled to the spindle 32 through gears 41 to provide rotation of the middle gimbal assembly 23 about the X axis.

Also mounted within the base gimbal assembly 33 and coupled to the spindle 32 are a tachometer unit 42, a base synchro 43 and a base brush assembly 44. The electronics unit 45 is connected to the base 36 through an electrical connector 46. Within the electronics unit 45 as shown schematically in FIG. 4, are three signal conditioner circuits 47 connected in parallel and coupled between X, Y and Z axes, strain gauges 37 and three parallel connected Burr-Brown amplifiers 51. The output signals from the three Burr-Brown amplifiers 51 are combined with the torque command signals $\overline{T_{X_c}}$ and $\overline{T_{Y_c}}$ in two parallel-connected control amplifiers 52. Monitor and indicator circuits 53 are connected to the output terminals of the electronic amplifiers 51 and provide control signals to power amplifiers 55 which in turn are also coupled between the control amplifiers 52 and the inner and middle torquers 25 and 40, respectively.

The most important role of the control moment gyroscope 10 is to be able to achieve precise control of the output torque. To achieve this control, a torque feedback control scheme is used. This scheme can best be presented by introducing the gyroscopic torque relationships. If X, Y and Z are body or vehicle fixed axes, equations expressing the gyroscopic torque relationships are:

$$T_X = T_M$$

$$T_Y = T_I \cos \alpha + T_M \tan \beta \sin \alpha$$

$$T_Z = T_I \sin \alpha - T_M \tan \beta \cos \alpha$$

in which $T_M$ is the torque exerted on the middle gimbal, and $T_I$ is the torque exerted on the inner gimbal.

These torques can also be related to the gimbal precession rates. The angles $\alpha$ and $\beta$ describe the rotation of the momentum vector about the X and Y axes. From the foregoing equations, it is shown that a single control moment gyroscope can achieve only two axis control. $T_X$ and $T_Y$ can be controlled by using the middle and inner gimbal torquers respectively, in which case the gyro will be erect when $\alpha$ and $\beta$ are both equal to zero. $T_Z$ control can be substituted for control of $T_Y$ by erecting the gyroscope to the $\alpha = 0$ and $\beta = 90°$ position. Since $T_X$ is not a function of $\alpha$ or $\beta$, it will not be disturbed by gyroscopic cross-coupling, while $T_Y$ or $T_Z$ are.

Figure 2:
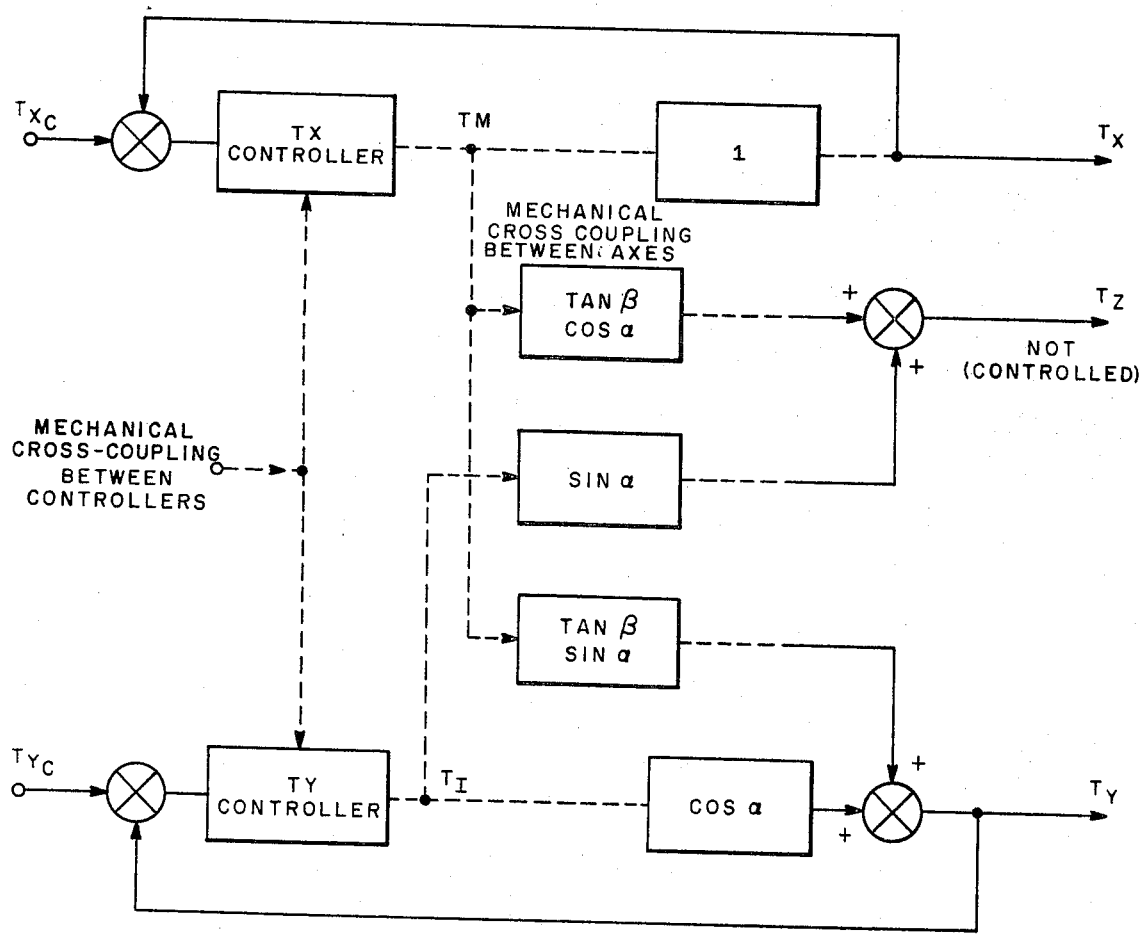
FIG. 2 is a block diagram of two axis torque control loop including integral torque feedback.

The block diagram of FIG. 2 shows that two axes control is obtained with a minimum of control equipment. As shown, the torque command signal $T_{X_c}$ is combined with a torque feedback signal $T_{X_f}$ to provide an input signal to a $T_X$ controller 60. The output torque $T_M$ from the $T_X$ controller 60 is the torque applied to the inner gimbal assembly 11. From the equations, $T_M$ equals $T_X$; therefore, there is no direct error resulting from cross-coupling effects on the torque $T_X$.

The torque command signal $T_{Y_c}$ is combined with the torque feedback signal $T_{Y_f}$ to provide an input to the $T_Y$ controller 61. The output torque $T_I$ is subjected to the effect of Y axis gain attenuation 62, cos $\alpha$, and gyroscopic cross-coupling 63, tan $\beta$ sin $\alpha$, to the Y axis. However, by employing torque feedback, these effects are accommodated, i.e., they produce no direct error, and this result is obtained with a minimum of control equipment. The torque $T_Z$ is affected by X axis gain attenuation 64, sin $\alpha$, and gyroscopic cross-coupling 65, $-\tan \beta \cos \alpha$, to the X axis. Therefore, torque signal $T_Z$ is not controlled. In order to provide three-axis torque control, at least two control moment gyroscopes 10 are required. Further, for optimum performance, it has been found that a control moment gyroscope should be employed for each axis torque control required.

The most critical element in the control moment gyroscope 10 is the flexure plate 34 which is secured to the base 36 through the beams 35 as shown in FIG. 1. Torques applied between the vehicle and the control moment gyro 10 are coupled through the spindle 32 to the flexure plate 34 and translated to the beams 35. In response to the applied torques, the beams 35 deflect in tension or compression with respect to the X, Y or Z axes.

Figure 3A:
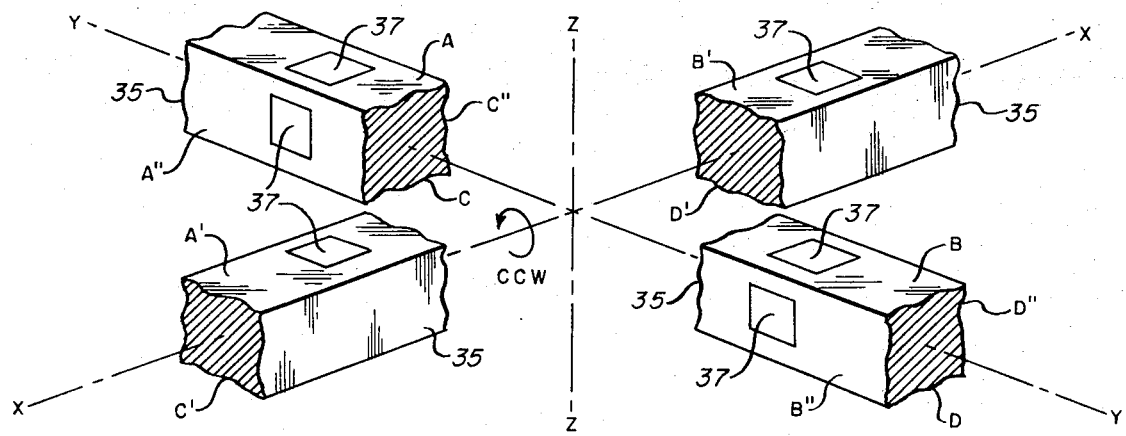
FIG. 3a is a sectional view of four beams which connect the flexure plate to the base.
Figure 3B:
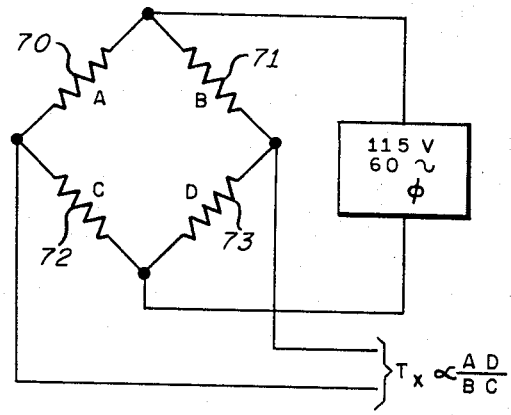
FIGS. 3b, 3c and 3d are electrical schematic diagrams of the bridge circuits which provide torque feedback signals.
Figure 3D:
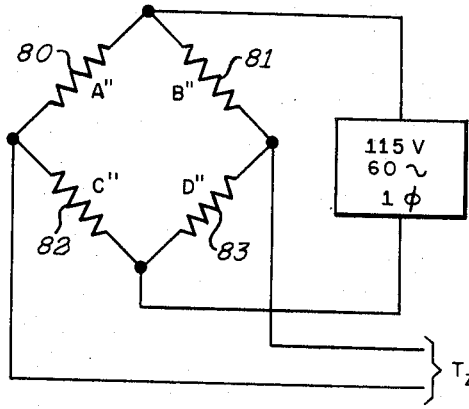
Figure 3C:
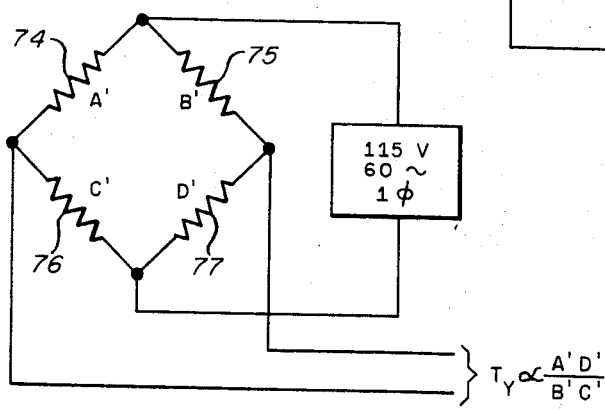

Referring to FIG. 3a, sectional views of the four mutually perpendicular beams 35 are shown with strain gauges 37 affixed to the surfaces A, B, C, D; A', B', C', D' and A''B''C''D''. Assumes an applied torque $T_X$ tends to cause the flexure plate 34 to rotate counterclockwise about the X axis. In translating from the spindle 32 of FIG. 1, through the plate 34, to the beams 35, the torque $T_X$ will cause surfaces A and D shown in FIG. 3a to deflect in compression and the surfaces B and C to deflect in tension. The effective lengths of the surfaces A and D increase while the effective lengths of the surfaces B and C decrease. Since strain is proportional to the ratio of the change in length to the original length, the strain gauges 37 affixed to the surfaces A, B, C, D in FIG. 3a are represented by the resistances 70, 71 and 72 and 73 respectively. Variations in strain experienced by the beam surfaces are coupled into the strain gauges 37 which are bonded to these surfaces and produces changes in the resistances of the gauges 37. The resistances 70 and 73, decrease and resistances 71 and 72 increase, thereby producing an electrical output signal across the bridge network indicative of the applied torque. This output signal $T_X$ is proportional to the ratio of the resistances $70 \cdot 73/71 \cdot 72$, or alternatively AD/BC. In a similar manner, as shown in FIGS. 3c and 3d, the torque supplied between the vehicle and the control moment gyroscope 10 about the Y and Z axes, respectively, may be expressed as $$T_Y \alpha\ 74 \cdot 77/75 \cdot 76, \text{ or alternatively}$$
$$A'\ D'/B'\ C'$$

and $$T_Z \alpha\ 80 \cdot 83/81 \cdot 82, \text{ or alternatively}$$
$$A''\ D''/B''\ C''$$

respectively.

The operation of the control moment gyroscope 10 will be described with reference to FIG. 4. The torque command signal $T_{X_c}$ and $T_{Y_c}$ derived from attitude and rate error data are applied to the control moment gyroscope 10. In reaction to the applied torques $T_X$, $T_Y$ and $T_Z$ acting between the vehicle and the control moment gyroscope 10 about the X, Y and Z axes, the flexure plate 34 shown in FIG. 1 deflects. The strain gauges 37, bonded to the surfaces to the beams 35, transform the structural deflections of the flexure plate 34 and the beams 35 into electrical output signals which are coupled through the electrical connector 46 to the electronics unit 45. These output signals are then applied to the signal conditioner circuits 47 and coupled to the electronic amplifiers 51 to produce the torque feedback signals $T_{X_f}$ and $T_{Y_f}$. The torque command signals $T_{X_c}$ and $T_{Y_c}$ are differentially combined with the torque feedback signals $T_{X_f}$ and $T_{Y_f}$ respectively in the control law amplifiers 52. The differential torque output signal produced by the control law amplifiers 52 are applied to the inner torquer module 25 and the middle torquer module 40. The torquers 25 and 40 then generate an opposing torque which tends to reduce the differential torque output signals toward zero thus causing an otherwise irreversible torquer gear drive to function as a reversible drive and allow a two-gimbal gyroscope to operate as a two-degree-of-freedom gyroscope. This minimizes one of the primary shortcomings of previous control moment gyroscopes as it permits the use of relatively large gear reductions and eliminates the necessity of large direct drive torquers while providing power and weight savings.

A specific embodiment of the invention utilizes a d.c. torquer, having a stall-torque of 35 inch-ounces and a slewing speed of 175 radius per second when operating at a voltage level of 24 volts, a power supply having a rated output of ±15 volts, ±400 milliamps, and Strain Gauges of 120 ohms to 2,000 ohms. This gyro had the following operating characteristics: Running speed at 200V, 400 cps-7,760 rpm; Peak power during runup-90watts; Total Weight — 64 lbs; Maximum slewing rate of the gimbals — 0.5 rad/sec; Over-all accuracy of the torque sensor — 2 percent; and linearity of the torque sensor — 0.5 percent.

While the invention has been described in its preferred embodiment, it is to be understood that the words which have been used are words of description rather than limitation and that changes may be made within the purview of the appended claims without departing from the true scope and spirit of the invention in its broader aspects.

We claim:

1. A vehicle mount control moment gyroscopic device which applies torques to said vehicle about three mutually perpendicular axes comprising
   gyroscopic rotor means,
   inner gimbal means which rotates about a first axis of said three axes and rotatably supports said gyroscopic rotors means, s inner actuator means coupled to said inner gimbal means for rotating said inner gimbal means with respect to said vehicle,
   middle gimbal means which rotates about a second axis of said three axes and rotatably supports said inner gimbal means,
   middle actuator means coupled to said middle gimbal means for rotating said middle gimbal means with respect to said vehicle,
   torque command means coupled to said gyroscopic device for supplying torque command signals from said vehicle to said gyroscopic device,
   torque sensing means coupled to said inner and middle gimbal means for detecting said torques applied between said gyroscopic device and said vehicle about said three mutually perpendicular axes,
   transducer means coupled to said sensing means for transforming said detected torques into torque feedback signals,
   combining means responsive to said torque feedback signals and said torque command signals for providing differential torque output signals, and
   control law means coupled to said combining means for translating said differential torque output signals into inner and middle gimbal torque signals which are applied to said inner and middle actuators whereby said inner and middle gimbal means are driven in a manner that reduces the magnitude of said differential torque output signals to substantially zero.

2. A control moment gyroscopic device as described in claim 1 in which said gyroscopic rotor means includes a flat disc-shaped rotor having a raised outer rim.

3. A control moment gyroscopic device as described in claim 1 in which said inner gimbal means includes a housing comprised of a ring section secured between upper and lower portions which serves as an inner gimbal.

4. A control moment gyroscopic device as described in claim 3 in which said upper and lower portions of said inner gimbal means are parabolic.

5. A control moment gyroscopic device as described in claim 1 in which said middle gimbal means is a bifurcated structure including a spindle supported in cantilever fashion.

6. A control moment gyroscopic device as described in claim 5 in which said spindle is supported in a cylindrical structure having a tubular receptacle for securing said spindle.

7. A control moment gyroscopic device as described in claim 1 in which said sensing means includes flexure means which produces structural displacements in accordance with said torques applied between said three axes.

8. A control moment gyroscopic device as described in claim 7 in which said flexure means includes a metal plate supported at which periphery by rectangular beams.

9. A control moment gyroscopic device as described in claim 1 in which said transducer means includes a plurality of strain gauges affixed to said sensing means.

10. A control moment gyroscopic device as described in claim 1 in which said control law means includes amplifiers and logic circuits for translating said differential torque output signals into inner and middle gimbal torque control signals.

11. In a control moment gyroscopic device mounted in a vehicle including in combination a gyroscopic rotor, inner and middle gimbals, inner and middle gimbal torquers and a source of torque command signals, the improvement comprising torque sensing means coupled to said inner and middle gimbals for providing torque feedback signals in accordance with torques acting between said vehicle and said gyroscopic apparatus,
  summing means coupled to said source of torque command signals and said torque sensing means for producing differential torque signals proportional to the difference between said torque feedback signals and said torque command signals, and
  control means coupled to said summing means for translating said differential torque output signals into inner and middle gimbal torque control signals.

12. In a control moment gyroscopic device as described in claim 11 in which said torque sensing means includes flexure means displaced by said torques acting between said vehicle and said gyroscopic device producing strain which is proportional to the magnitude of said torques and a plurality of strain sensors that transform said strain into torque feedback signals proportional to said displacements.

13. In a control moment gyroscopic device as described in claim 12 in which said flexure means includes a circular flexure plate supported at its periphery by a plurality of rectangular beams having said strain sensors affixed to said beams.

14. In a control moment gyroscopic device as described in claim 13 in which said strain sensors include a plurality of strain gauges.

15. In a control moment gyroscopic device as described in claim 11 in which said summing means includes operational amplifiers.

16. In a control moment gyroscopic device as described in claim 11 in which said control means includes logic circuits and amplifiers which translate said differential signals into inner and middle gimbal torque control signals.

* * * * *